United States Patent
Bittermann et al.

(10) Patent No.: US 6,333,956 B1
(45) Date of Patent: Dec. 25, 2001

(54) BLOW-OFF DEVICE AND METHOD OF BLOWING OFF LIVE STEAM

(75) Inventors: Dietmar Bittermann, Fürth; Erwin Laurer, Möhrendorf; Jürgen Model, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/539,236

(22) Filed: Mar. 30, 2000

Related U.S. Application Data

(63) Continuation of application No. PCT/DE98/02792, filed on Sep. 18, 1998, now Pat. No. 9,917,300.

(30) Foreign Application Priority Data

Sep. 30, 1997 (DE) .............................................. 197 43 333

(51) Int. Cl.[7] ................. G21C 9/00; G21D 3/04
(52) U.S. Cl. .................. 376/283; 376/277; 376/298
(58) Field of Search .................... 376/283, 282, 376/277, 299, 298

(56) References Cited

U.S. PATENT DOCUMENTS

| | | | |
|---|---|---|---|
| 4,158,603 | * 6/1979 | Kuhnel | 176/38 |
| 4,172,009 | * 10/1979 | Simon et al. | 176/38 |
| 4,304,198 | 12/1981 | Stiefel | 122/504 |
| 4,428,904 | * 1/1984 | Kuhnel | 376/283 |
| 4,863,677 | 9/1989 | Eckadt | 376/283 |
| 4,873,050 | * 10/1989 | Eckardt | 376/283 |
| 4,927,596 | * 5/1990 | Minnick | 376/283 |
| 5,017,331 | 5/1991 | Eckardt | 376/313 |
| 5,122,333 | * 6/1992 | Larsen et al. | 376/309 |
| 5,223,209 | * 6/1993 | Eckardt | 376/283 |
| 5,293,413 | 3/1994 | Eckardt | 376/314 |
| 5,428,652 | 6/1995 | Conrads et al. | 376/299 |
| 5,872,825 | * 2/1999 | Eckardt | 376/314 |

FOREIGN PATENT DOCUMENTS

| | | |
|---|---|---|
| 24 30 787 | 1/1976 | (DE) . |
| 3715467 | * 11/1988 | (DE) ................................. 376/283 |
| 37 15 466 A1 | 12/1988 | (DE) . |
| 38 06 872 A1 | 9/1989 | (DE) . |
| 38 24 606 C2 | 1/1992 | (DE) . |
| 41 41 496 | 7/1992 | (DE) . |
| 41 10 680 A1 | 9/1992 | (DE) . |
| 195 32 366 C1 | 12/1996 | (DE) . |
| 0 263 993 | 4/1988 | (EP) . |
| 03-235093 | * 10/1991 | (JP) .................................... 376/283 |

OTHER PUBLICATIONS

Japanese Patent Abstract No. 3–235093 (A) (Osawa), dated Sep. 21, 1991, P–1299 Jan. 16, 1992, vol. 16/No. 17, 1 page.
"Containment venting filter designs incorporating stainless–steel fiber filters"(Dillmann et al.), dated 1988, Kerntechnik 53, No. 1, Carl Hanser Verlag, München, pp. 75–80.

* cited by examiner

Primary Examiner—Michael J. Carone
Assistant Examiner—Jack Keith
(74) Attorney, Agent, or Firm—Herbert L. Lerner; Laurence A. Greenberg; Werner H. S. Stemer

(57) ABSTRACT

A blow-off device for live steam includes a filter for radioactive substances in order to increase operational safety in a nuclear power plant. The filter is preferably integrated in a housing of a muffler or sound absorber and is disposed on a slide which is movable along an axis under the effect of gravitational force and in particular also serves as a closure for an outlet opening of the muffler or sound absorber. A method of blowing off live steam is also provided.

17 Claims, 2 Drawing Sheets

BLOW-OFF DEVICE AND METHOD OF BLOWING OFF LIVE STEAM

CROSS-REFERENCE TO RELATED APPLICATION

This application is a continuation of International Application No. PCT/DE98/02792, filed Sep. 18, 1998 now WO99/17300 issued Apr. 8, 1999, which designated the United States.

BACKGROUND OF THE INVENTION

FIELD OF THE INVENTION

The invention lies within the field of safety devices for nuclear power plants. The invention relates to a blow-off device for live steam from a nuclear power plant, in which the blow-off device is in communication with at least one live-steam line of the nuclear power plant. The invention also relates to a method of blowing off live steam from a live-steam line of a nuclear power plant.

In a nuclear power plant, steam generated in a reactor pressure vessel or in a steam generator is directed through a live-steam line to a turbine. The reactor pressure vessel and the steam generator are accommodated in a reactor building, which has a safety container surrounded by a protective casing. The turbine is located in a turbine building situated outside the reactor building. A line opening into the atmosphere branches off from the live-steam line upstream of a first stop fitting, as seen in the flow direction. Adjoining that line is a line section with a blow-off control valve and a blow-off stop valve, as well as a section with a safety valve, which is connected in parallel with those valves. The line sections that are connected in parallel open out in a common blow-out line. The blow-out line, possibly together with blow-out lines belonging to other steam generators of the nuclear power plant, leads into a muffler or sound absorber, which has an outlet opening to the atmosphere.

The live-steam line as well as a feedwater line pass through both the safety container and the protective casing of the reactor building. Barriers between a primary circuit leading through the reactor pressure vessel and the atmosphere are therefore valve cones of the safety valve and of the blow-off stop valve and, in the case of a pressurized water reactor, also heating tubes of the steam generator, which separate the primary circuit from a secondary circuit.

In the case of a pressurized water reactor, the steam generated in the steam generator is non-radioactive in normal operation. In the event of a serious incident, damage could occur to the heating tubes in the steam generator, even if that is highly unlikely. As a result, radioactive substances would pass out of the primary circuit of the pressurized water reactor into the live-steam line. In that case, the valve cones of the safety valve and of the blow-off stop valve, together with valve seats, would form a barrier between the primary circuit and the atmosphere.

Even though the technology of valve cones and valve seats has been and is being constantly improved, 100% tightness of the seats cannot be guaranteed, since the possibility of foreign bodies or contaminants being located on the valve seat cannot be ruled out, especially if blow-off has been effected beforehand through the affected valves under the conditions of a serious incident.

SUMMARY OF THE INVENTION

It is accordingly an object of the invention to provide a blow-off device for live steam from a nuclear power plant which prevents an escape of radioactive substances into the atmosphere even if inadequate tightness of a safety valve or a blow-off stop valve is assumed, and a method of blowing off live steam from a nuclear power plant which enables live steam contaminated by radioactivity to be blown off from a line of the nuclear power plant without radioactive pollution of the atmosphere if an incident occurs in the nuclear power plant, in which the device and the method overcome the hereinafore-mentioned disadvantages of the heretofore-known devices and methods of this general type.

With the foregoing and other objects in view there is provided, in accordance with the invention, a blow-off device for live steam from at least one live-steam line of a nuclear power plant, comprising a blow-off line for the live steam, the blow-off line in communication with the at least one live-steam line and opening into the atmosphere; a filter disposed in the blow-off line for filtering radioactive substances; and a non-liquid activity holdback agent embedded in the filter. The filter effect may be based on physical or chemical as well as biological principles.

With the blow-off device according to the invention, radioactive substances can be removed from the live steam which has passed, for example, a safety valve or a blow-off stop valve that is not closing perfectly. The filtered live steam can then be blown off into the atmosphere without radioactive pollution of the latter. The same applies to such live steam which, for example when a blow-off stop valve is opened, in particular in order to bring about a pressure balance, is to be deliberately blown off into the atmosphere.

The blow-off line may be formed, for example, by a line which branches off from a line section through which the live steam passes into the atmosphere in normal operation. The branching line, that is the blow-off line, may be provided, for example, with a stop device and is opened, for example, in the event of an incident. It preferably has a fixed filter, so that very long filter sections can be realized in an advantageous manner.

In accordance with another feature of the invention, there is provided a muffler or sound absorber, for example, associated with the filter, the muffler or sound absorber including an inlet opening and a first outlet opening. The combination of the muffler or sound absorber with the filter in one structural unit permits a cost-effective, reliable and simple type of construction of the blow-off device in an advantageous manner.

In accordance with a further feature of the invention, the filter is at least partly integrated in a housing of the muffler or sound absorber. As a result, the construction of the blow-off device including a filter and a muffler or sound absorber is further simplified.

In accordance with an added feature of the invention, the filter is surrounded by a receptacle having a feed opening which can be closed. This results in it being advantageously possible to wet the filter with live steam only in a demand case (e.g. an incident) and to shield it, with the feed opening closed, in normal operation from the live steam to be blown off. In particular, the blow-off line can be closed by closing the feed opening.

In accordance with an additional feature of the invention, the first outlet opening can be closed and the inlet opening can be connected through a filter to a second outlet opening of the muffler or sound absorber. As a result, the live steam can advantageously be blown off into the atmosphere in normal operation through the first outlet opening and in the demand case through the blow-off line containing the filter and through the second outlet opening.

The blow-out lines of the power plant, for example, which are connected to the safety valve or the blow-off stop valve, open into the inlet opening.

In accordance with yet another feature of the invention, there is provided a slide which is movable inside the muffler or sound absorber along an axis and through the use of which the first outlet opening can be closed and/or on which the filter is disposed.

For safety reasons, the movement of the slide is preferably exclusively linear (rectilinear) and not curved or angular. The slide generally refers to a movable, preferably guided system part of the blow-off device. The designation "slide", for example, therefore also stands for a rider, a carriage, a rolling body or a sliding body. In particular the construction in which the first outlet opening can be closed by the slide and in which the filter is disposed on the slide results in the advantage that both the first outlet opening is closed and the filter is positioned at the desired location in the blow-off line, which is cleared, for example after opening of the feed opening, by a single movement of the slide.

In accordance with yet a further feature of the invention, the axis of the blow-off device is preferably essentially vertical. As a result, the blow-off device is especially suitable for such muffler or sound absorbers in which the live steam is blown off upward.

In accordance with yet an added feature of the invention, the slide is movable under the effect of gravitational force and closes the first outlet opening in an end position of minimum potential energy. In this case, minimum potential energy refers to the absolute minimum within a range in which the slide can be moved. For example, such an end position may be a bottom stop of a guide rail.

A particular safety advantage is achieved by the movement under the effect of gravitational force, since gravitational force is a natural phenomena and is effective in a passive manner and does not depend on the presence or functioning of any actuating drives. At least it is not necessary to provide a powerful actuating drive which can move the possibly very large mass of the slide. If at all, an actuating drive which moves, for example, a release latch with a small expenditure of force is necessary.

After the movement of such a release latch, the slide, in essentially free fall, can pass, for example, from a top normal position into the end position. A damping device, for example, is provided for the last part of the free fall travel.

In accordance with yet an additional feature of the invention, the inlet opening, in the end position of the slide, is connected to the atmosphere through the filter. For example, the feed opening is unlocked for this purpose.

The blow-off device may also be constructed in such a way that the movement of the slide in free fall can produce a superimposed impulse, through the use of which a closure of the feed opening can be removed and/or the inlet opening can be connected to the atmosphere through the filter. In an advantageous manner, the changeover of the blow-off device from normal operation to demand case can thereby be largely automated.

For example, a drive is also provided with which the slide can be removed from the end position with minimum potential energy and can be moved in particular into the top normal position.

With the objects of the invention in view, there is also provided a method of blowing off live steam from a live-steam line of a nuclear power plant, which comprises providing a blow-off line communicating with the live-steam line; and filtering radioactive substances from live steam before the live steam is blown off into the atmosphere through the blow-off line, if an incident occurs in the nuclear power plant.

This results in the special safety advantage of providing an additional barrier between the reactor pressure vessel containing radioactive substances and the atmosphere.

In a pressurized water reactor, a first barrier is formed of the heating tubes of the steam generator, which separate the radioactive primary circuit from the live-steam line. The valve cones or the valve seats in the stop or safety valves which are assigned to the blow-out lines form a second barrier. In the event of a simultaneous failure of steam generator tubes or a failure or leakage of the stop or safety valves, a third barrier relative to the atmosphere is provided by the filter. This barrier works according to operating principles which are physically and chemically fundamentally different from the two aforesaid barriers and therefore brings about a particular and advantageous increase in safety.

Other features which are considered as characteristic for the invention are set forth in the appended claims.

Although the invention is illustrated and described herein as embodied in a blow-off device and a method of blowing off live steam, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
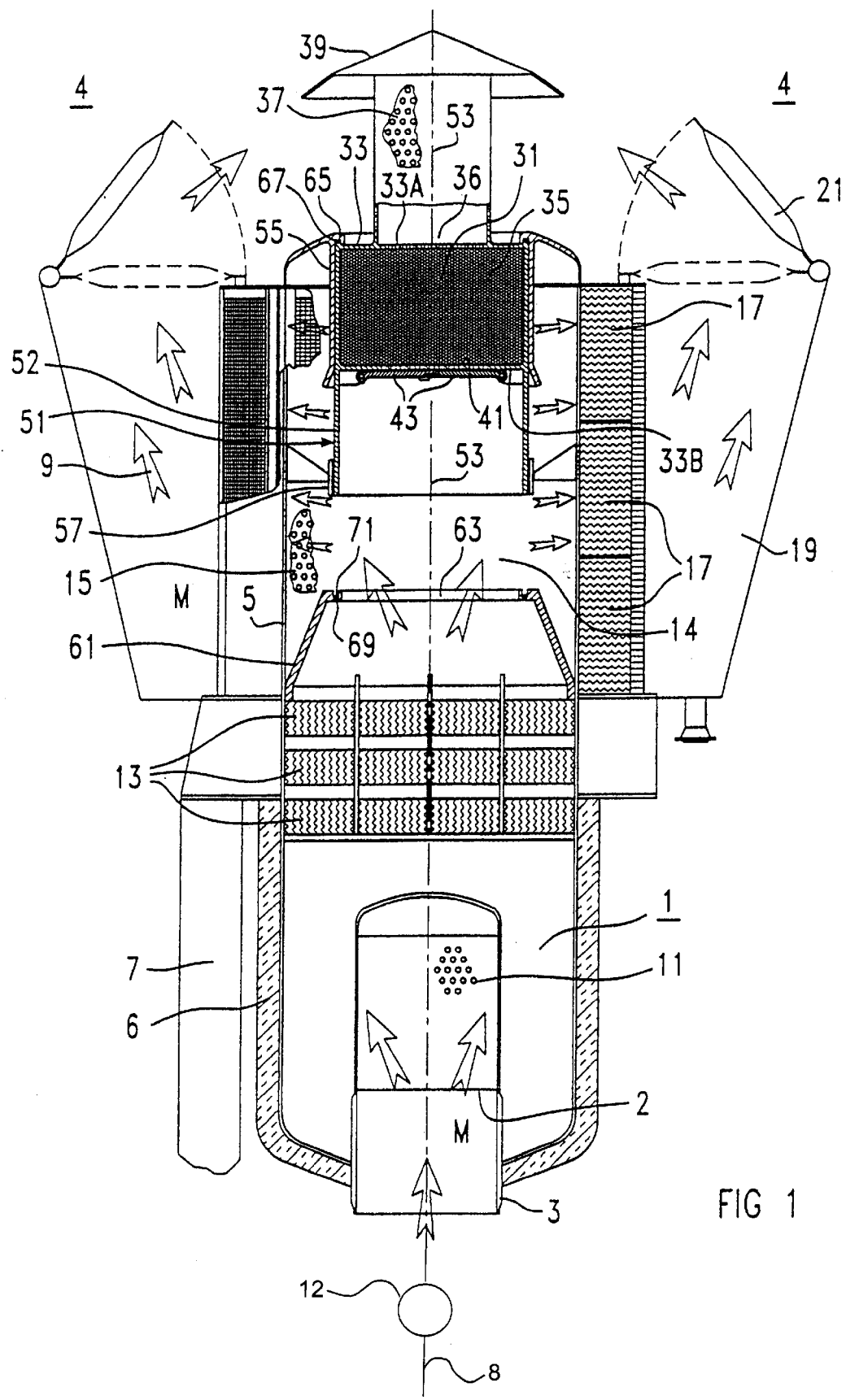
FIG. 1 is a fragmentary, diagrammatic, elevational view of a blow-off device including a muffler or sound absorber, which is shown in normal operation.
Figure 2:
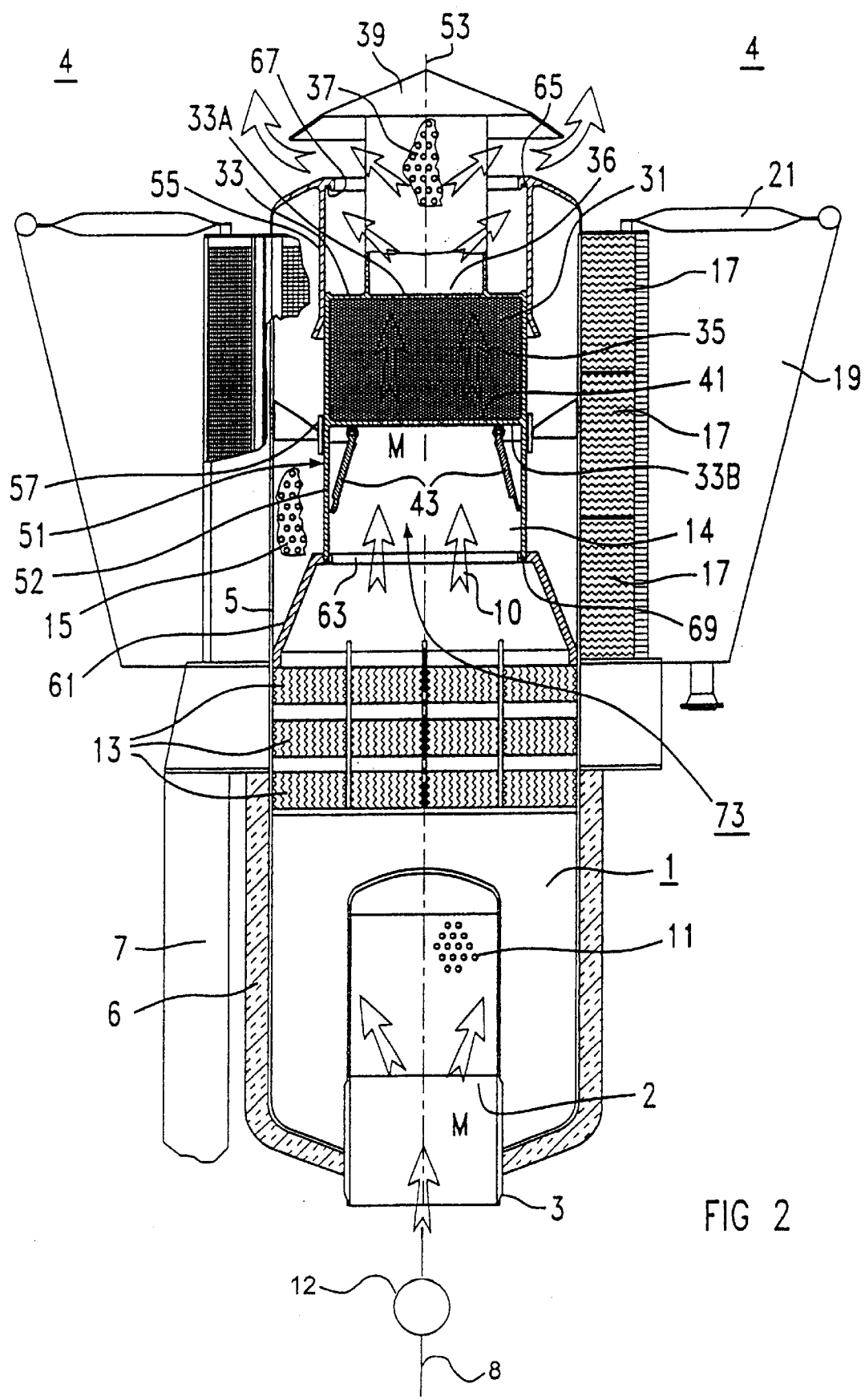
FIG. 2 is a view of the blow-off device similar to FIG. 1, which is shown in a demand case (filter operation).

Referring now to FIGS. 1 and 2 of the drawings in detail, there is seen a muffler or sound absorber which is designated overall by reference numeral 1 and has an inlet opening 2 into which a blow-out line 3 of a pressurized water reactor opens. The blow-out line 3 is connected through a blow-off stop valve and/or safety valve, represented by reference numeral 12, to a live-steam line 8.

Live steam M entering the muffler or sound absorber 1 through the blow-out line 3 is blown off into the surrounding atmosphere 4 through the use of the muffler or sound absorber 1. The muffler or sound absorber 1 has a housing 5 with a bottom part which is provided with thermal insulation 6. An upright 7 serves to fasten the muffler or sound absorber 1.

FIGS. 1 and 2 respectively show the blow-off device in normal operation and in filter operation (demand case), e.g. in the event of an incident. Respective main flow directions in the different operating modes are indicated by respective arrows 9 and 10.

In normal operation shown in FIG. 1, the live steam M, after passing the inlet opening 2, flows through a first perforated-plate configuration 11 and a first steel-wool configuration 13 into a first outlet opening 14. From there, the live steam M flows through a second perforated-plate configuration 15 and a second steel-wool configuration 17 into a plurality of segmental chests 19. The segmental chests 19 have protective flaps 21, which can be swung open under the pressure of the outflowing live steam M, so that the live steam M can escape into the surrounding atmosphere 4.

A filter 31 for radioactive substances is located centrally between the segmental chests 19. The filter 31 is enclosed by a receptacle 33. The filter has a close-meshed screen 35 in order to provide a homogenous deposit of an activity holdback agent. A top end wall 33A of the receptacle 33 is permeable to gas or steam in sections, so that the live steam M, after flowing through the filter 31, reaches a second outlet opening 36, from which it flows out into the atmosphere 4 through a perforated-plate tube 37. The perforated-plate tube 37 carries a canopy 39 for protecting the filter 31.

A bottom end wall 33B of the receptacle 33 is permeable to gas and steam in a certain section, a so-called feed opening 41. The feed opening 41 can be closed by two flaps 43. In the demand case shown in FIG. 2, the flaps 43 are opened, so that the live steam M passes in the direction of the arrows 10 through the filter 31 and the second outlet opening 36 into the atmosphere 4. Radioactive substances are then retained in the filter 31 containing the activity holdback agent.

Furthermore, a slide 51, which is formed from the receptacle 33 and a sliding tube 52 extending the receptacle 33, is shown in FIGS. 1 and 2. The slide 51 therefore also carries the filter 31 and the flaps 43. In FIG. 1, the slide 51 is shown in its top end position (normal position). The slide 51 is movable in the direction of a vertical axis 53. In order to provide guidance, a guide shroud 55 is provided in a top part of the blow-off device and a guide collar 57 is provided in a bottom part. The slide 51 is held in the depicted top end position by a non-illustrated release device, for example a latch.

At the start of the demand case, i.e. if the filter operation is desired, the release latch is actuated and the slide 51 drops in free fall into a bottom end position of minimum potential energy. This end position is shown in FIG. 2. The slide then lies on a truncated cone 61 having a cone opening 63. In this end position, the first outlet opening 14 of the muffler or sound absorber 1 is covered by the slide 51, in particular by the sliding tube 52, and is thus closed. Since the flaps 43, which are released by the free fall, are opened, the live steam M entering the muffler or sound absorber 1 through the inlet opening 2 can only pass into the atmosphere 4 after passing the filter 31, as is shown by arrows indicating the flow direction 10.

An unlocking system which opens the flaps 43 automatically during free fall of the slide 51 is not explicitly depicted in FIGS. 1 and 2.

A first annular groove 65 and a first seal 67 are provided in order to seal off the slide 51 from the housing 5 of the muffler or sound absorber 1 in the top end position illustrated in FIG. 1. A second annular groove 69 made in the truncated cone 61 and having a second seal 71 serves to seal off the slide 51 from the truncated cone 61 in the bottom end position illustrated in FIG. 2.

In the demand case shown in FIG. 2, a blow-off line which is designated overall by reference numeral 73 and leads to the surrounding atmosphere 4 is formed by the first perforated-plate configuration 11, the first steel-wool configuration 13, the bottom part of the housing 5, the truncated cone 61 and the slide 51. This blow-off line has the filter 31 for radioactive substances.

We claim:

1. In a blow-off device for steam from at least one live-steam line of a nuclear power plant, the improvement comprising:
    a blow-off line for the steam, said blow-off line in communication with the at least one live-steam line and opening into the atmosphere;
    a filter disposed in said blow-off line for filtering radioactive substances;
    a muffler associated with said filter, said muffler having an inlet opening, a first outlet opening, and a second outlet opening; said first outlet opening being a first outlet opening being closeable; and said second outlet being openable for connecting said filter to said inlet opening.

2. The blow-off device according to claim 1, wherein said muffler has a housing, and said filter is at least partly integrated in said housing.

3. The blow-off device according to claim 1, including a receptacle surrounding said filter, said receptacle having a feed opening to be closed.

4. The blow-off device according to claim 1, including a slide to be moved inside said muffler along an axis for closing said outlet opening.

5. The blow-off device according to claim 1, including a slide to be moved inside said muffler along an axis for closing said outlet opening, said filter disposed on said slide.

6. The blow-off device according to claim 1, including a slide to be moved inside said muffler along an axis, said filter disposed on said slide.

7. The blow-off device according to claim 4, wherein said axis is substantially vertical.

8. The blow-off device according to claim 5, wherein said axis is substantially vertical.

9. The blow-off device according to claim 6, wherein said axis is substantially vertical.

10. The blow-off device according to claim 4, wherein said slide is movable under the effect of gravitational force and closes said outlet opening in an end position of minimum potential energy.

11. The blow-off device according to claim 5, wherein said slide is movable under the effect of gravitational force and closes said outlet opening in an end position of minimum potential energy.

12. The blow-off device according to claim 6, wherein said slide is movable under the effect of gravitational force and closes said outlet opening in an end position of minimum potential energy.

13. The blow-off device according to claim 10, wherein said inlet opening is in communication through said filter with the atmosphere, in said end position.

14. The blow-off device according to claim 11, wherein said inlet opening is in communication through said filter with the atmosphere, in said end position.

15. The blow-off device according to claim 12, wherein said inlet opening is in communication through said filter with the atmosphere, in said end position.

16. The blow-off device according to claim 1, including a non-liquid activity holdback agent embedded in said filter.

17. In a method of blowing off steam from a live-steam line of a nuclear power plant, the improvement which comprises:
    providing a blow-off line communicating with the live-steam line, a filter disposed in the blow-off line for filtering radioactive substances, and a muffler associated with the filter, the muffler having an inlet opening, a first outlet opening, and a second outlet opening connected through the filter to the inlet opening; and filtering radioactive substances from the steam before the steam is blown off into the atmosphere through the blow-off line, if an incident occurs in the nuclear power plant by closing the first outlet opening and opening the second outlet opening.

* * * * *